(12) United States Patent
Amemura (10) Patent No.: US 8,977,870 B2
(45) Date of Patent: Mar. 10, 2015

(54) APPARATUS FOR DETERMINING A USB COMPATIBLE DEVICE, AND SUPPLYING CORRESPONDING POWER THEREAFTER

(75) Inventor: Tatsuaki Amemura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 438 days.

(21) Appl. No.: 13/372,910

(22) Filed: Feb. 14, 2012

(65) Prior Publication Data
US 2012/0210143 A1 Aug. 16, 2012

(30) Foreign Application Priority Data
Feb. 16, 2011 (JP) ................................. 2011-031031

(51) Int. Cl.
G06F 1/00 (2006.01)
G06F 1/26 (2006.01)

(52) U.S. Cl.
CPC ..................................... G06F 1/266 (2013.01)
USPC ........................................................ 713/300

(58) Field of Classification Search
CPC . G06F 2213/0042; G06F 13/38; G06F 13/00; G06F 13/20
USPC ........................................................ 713/300
See application file for complete search history.

(56) References Cited

U.S. PATENT DOCUMENTS

| 2007/0049333 A1 | 3/2007 | Jeong et al. |
| 2008/0155143 A1 | 6/2008 | Mochizuki et al. |
| 2009/0193156 A1 | 7/2009 | Suematsu |
| 2010/0174835 A1* | 7/2010 | Chung ............................ 710/15 |
| 2010/0233908 A1 | 9/2010 | Tseng |
| 2011/0064023 A1* | 3/2011 | Yamamoto et al. ........... 370/328 |

FOREIGN PATENT DOCUMENTS

| CN | 1967965 A | 5/2007 |
| CN | 201402849 Y | 2/2010 |
| CN | 101685974 A | 3/2010 |
| JP | 2003-195985 A | 7/2003 |
| JP | 2005-050194 A | 2/2005 |
| JP | 2007-068184 A | 3/2007 |
| JP | 2008-146419 A | 6/2008 |
| JP | 3151486 | 6/2009 |
| JP | 2009-176190 A | 8/2009 |
| JP | 2010-219531 A | 9/2010 |
| JP | 2010-282574 A | 12/2010 |
| JP | 2011-015539 | 1/2011 |

OTHER PUBLICATIONS

Universal Searial Bus 3.0 Specifcation, Nov. 12, 2008, revision 1.0.*

* cited by examiner

Primary Examiner — Jaweed A Abbaszadeh
Assistant Examiner — Xuxing Chen
(74) Attorney, Agent, or Firm — Renner, Otto, Boisselle & Sklar, LLP (57) ABSTRACT

An electronic apparatus includes: a DC-DC converter for supplying power to an external device connected via a USB 3.0 host connector; and a device determination section for determining, via one terminal of the USB 3.0 host connector, the external device connected to the USB 3.0 host connector. Upon determination by the device determination section that a USB compatible device is connected, the DC-DC converter supplies power to the USB compatible device.

4 Claims, 4 Drawing Sheets

APPARATUS FOR DETERMINING A USB COMPATIBLE DEVICE, AND SUPPLYING CORRESPONDING POWER THEREAFTER

CROSS-REFERENCE TO RELATED APPLICATIONS

This Nonprovisional application claims priority under 35 U.S.C. §119(a) on Patent Application No. 2011-031031 filed in Japan on Feb. 16, 2011, the entire contents of which are hereby incorporated by reference.

BACKGROUND

1. Technical Field

The present invention relates to an electronic apparatus including a USB connector and to an electronic apparatus system including the electronic apparatus.

2. Description of Related Art

Some electronic apparatuses such as notebook personal computers or tablet mobile terminals include USB (Universal Serial Bus) interfaces, and external devices including USB interfaces are connected to such electronic apparatuses, thereby allowing functions to be added to the electronic apparatuses.

Such external devices include various types of devices such as: a printing apparatus, e.g., a printer; an imaging apparatus, e.g., a digital camera; a storage apparatus, e.g., a USB memory; and a communication apparatus, e.g., a wireless LAN.

Not only a data transfer method but also a power supply method for an external device are defined by USB standards. Therefore, even when an external device is not internally equipped with a power source, power may be supplied to the external device from an electronic apparatus via a USB interface, thus achieving an advantage that no additional power source has to be prepared for the external device such as a USB memory, the power consumption of which is low. Further, examples of USB interface standards include USB 2.0 and USB 3.0 (see Japanese Utility Model Registration No. 3151486).

SUMMARY OF THE INVENTION

However, a specified value for a current (power) suppliable from an electronic apparatus is decided in accordance with USB standards; hence, when an external device, requiring a current (power) higher than a specified value, is used by being connected to an electronic apparatus, the external device cannot be solely used. In such a case, an additional power source has to be prepared to supply necessary power to the external device. Furthermore, suppose that an upgrade from USB 2.0 standards to USB 3.0 standards is performed and a current specified value is also increased from 500 mA to 900 mA, but an external device, such as a display requiring large power, is used. In that case, there will be no change in the situation in which an additional power source has to be prepared.

The present invention has been made in view of the above-described circumstances, and its object is to provide: an electronic apparatus capable of increasing suppliable power while complying with USB standards; and an electronic apparatus system including the electronic apparatus.

A first aspect of the present invention provides an electronic apparatus including a USB connector having a plurality of terminals, the electronic apparatus including: a power supply section for supplying power to an external device connected via the USB connector; and a device determination section for determining which of a USB 2.0 device, a USB 3.0 device and a USB compatible device corresponds to the external device, wherein upon determination by the device determination section that the external device is a USB compatible device, the power supply section supplies power to the USB compatible device.

A second aspect of the present invention provides the electronic apparatus wherein the USB connector is for a USB 3.0 interface having first to ninth terminals, and wherein the device determination section determines the external device via the seventh terminal.

A third aspect of the present invention provides the electronic apparatus wherein when a current flowing through the seventh terminal is equal to or higher than a current threshold value, the device determination section determines that the USB compatible device is connected, and wherein the power supply section supplies power via at least one of the fifth, sixth, eighth and ninth terminals.

A fourth aspect of the present invention provides the electronic apparatus further including: a switching element interposed between an output terminal of the power supply section and the seventh terminal; and a voltage detection section for detecting a turnover voltage obtained by inverting a voltage of the seventh terminal, wherein when the voltage detected by the voltage detection section is equal to or lower than a voltage threshold value, the device determination section determines that the USB compatible device is connected, and wherein the electronic apparatus further includes a power source control section for carrying out control so as to turn on the switching element to supply power from the power supply section to the seventh terminal upon determination by the device determination section that the USB compatible device is connected.

A fifth aspect of the present invention provides an electronic apparatus system including: the electronic apparatus according to any one of the foregoing aspects; and at least one external device that is a USB 2.0 device, a USB 3.0 device or a USB compatible device.

In the present invention, the electronic apparatus includes: the power supply section for supplying power to an external device connected via a USB connector; and the device determination section for determining the external device as a USB 2.0 device, a USB 3.0 device or a USB compatible device. The USB connector is, for example, a USB connector compliant with USB 3.0 standards and having nine terminals consisting of terminals 1 to 9. The terminals 1 to 4 are compliant with USB 2.0 standards, and the terminals 5 to 9 serve as an expansion section for USB 3.0 standards. For example, the terminal 7 may be used as one terminal of the USB connector. Examples of types of external devices include: a USB 2.0 device compliant with USB 2.0 standards (i.e., a USB 2.0 device in which a current specified value is compliant with USB 2.0 standards); a USB 3.0 device compliant with USB 3.0 standards (i.e., a USB 3.0 device in which a current specified value is compliant with USB 3.0 standards); and a USB compatible device other than USB 2.0 device or USB 3.0 device (i.e., a USB compatible device in which a current specified value is higher than a value defined by USB 2.0 standards or USB 3.0 standards).

Upon determination by the device determination section that the external device is a USB compatible device, the power supply section supplies power to the USB compatible device. When power is supplied to the USB compatible device, the terminals other than the terminals 1 to 4, the functions of which are defined by USB 2.0 and USB 3.0 standards, may be used. Thus, when a USB 2.0 device is connected, data transfer and power supply compliant with USB 2.0 standards are performed, and when a USB 3.0 device is connected, data transfer and power supply compliant with USB 3.0 standards are performed; in addition, when the USB compatible device is connected, necessary power may be supplied from the power supply section, and suppliable power may be increased while compliance with USB standards is ensured.

In the present invention, the USB connector has the first to ninth terminals and is thus used for a USB 3.0 interface, and the device determination section determines the external device via the seventh terminal. In the case of a USB 3.0 interface, for example, the terminal 1 (first terminal) is associated with a VBUS (5 V power supply line), the terminals 2 and 3 (second and third terminals) are associated with USB 2.0 differential signal lines, the terminal 4 (fourth terminal) is associated with a ground line, the terminals 5 and 6 (fifth and sixth terminals) are associated with differential signal lines for transmission for USB 3.0, the terminal 7 (seventh terminal) is associated with a second ground line, and the terminals 8 and 9 (eighth and ninth terminals) are associated with differential signal lines for receiving for USB 3.0. In order to perform data transfer and power supply compliant with USB 2.0 and USB 3.0 standards, the terminals 1 to 6, the terminal 8 and the terminal 9 are essential, and therefore, the terminal 7 associated with the second ground line is used for a signal line for determining the external device. Thus, the external device may be determined while compliance with USB 2.0 and USB 3.0 standards is ensured.

In the present invention, when the current flowing through the seventh terminal is equal to or higher than the current threshold value, the device determination section determines that the USB compatible device is connected. When a USB 2.0 device is connected, the terminals 1 to 4 (first to fourth terminals) are used, but nothing is connected to the terminals 5 to 9 (fifth to ninth terminals); hence, for example, the terminal 7 (seventh terminal) is in an opened (open) state and has a high impedance. Therefore, a given voltage (of about 5 V, for example) is applied to the terminal 7 of the USB compatible device in advance. The external device may be determined by detecting the current inputted through the terminal 7 of the USB connector. For example, when the current equal to or higher than a given value is detected, the external device may be determined as the USB compatible device, and when the current equal to or higher than the given value cannot be detected, the external device may be determined as a USB 2.0 device.

The power supply section supplies power via at least one of the fifth, sixth, eighth and ninth terminals. In the case of a USB 2.0 device, the fifth to ninth terminals are not used. Therefore, when a USB 2.0 device is connected, power is supplied via the first terminal (VBUS); on the other hand, when the USB compatible device is connected, power is supplied via at least one of the fifth, sixth, eighth and ninth terminals in addition to the first terminal. Thus, a USB 2.0 device is connectable to the electronic apparatus, and in addition, an increase in supplied power is enabled when the USB compatible device is connected to the electronic apparatus.

In the present invention, the electronic apparatus includes: the switching element interposed between the output terminal of the power supply section and the seventh terminal; and the voltage detection section for detecting the turnover voltage obtained by inverting the voltage of the seventh terminal. The switching element is an FET, for example. For example, the seventh terminal is connected to a voltage source (or pulled up to the voltage source) via a resistor, the seventh terminal is also connected to an input terminal (e.g., a base of a transistor) of a voltage inverting element (e.g., a transistor) for inverting the voltage of the seventh terminal, an output terminal of the voltage inverting element is pulled up to a voltage source, and the voltage of the output terminal is detected, thus detecting the turnover voltage.

When the voltage detected by the voltage detection section is equal to or lower than the voltage threshold value, the device determination section determines that the USB compatible device is connected. For example, in the case of a USB 3.0 device, the voltage of the seventh terminal is at a ground level; therefore, when a USB 3.0 device is connected, the voltage level of the seventh terminal becomes a ground level, a transistor serving as a voltage determination element is turned OFF, and the turnover voltage becomes a high level (voltage of the voltage source). On the other hand, in the case of the USB compatible device, a given voltage (of about 5 V, for example) is applied to the seventh terminal of the USB compatible device in advance. When the USB compatible device is connected, the voltage level of the seventh terminal becomes a given voltage (of about 5 V, for example), the transistor serving as the voltage determination element is turned ON, and the turnover voltage becomes a low level (i.e., a ground level voltage equal to or lower than the voltage threshold value).

The power source control section carries out control so as to turn ON the switching element to supply power from the power supply section to the seventh terminal upon determination by the device determination section that the USB compatible device is connected. In the case of a USB 3.0 device, the fifth, sixth, eighth and ninth terminals are used for data transfer. Therefore, when a USB 3.0 device is connected, power is supplied via the first terminal (VBUS); on the other hand, when the USB compatible device is connected, power is supplied via the seventh terminal in addition to the first terminal. Thus, a USB 3.0 device is connectable to the electronic apparatus, and in addition, an increase in supplied power is enabled when the USB compatible device is connected to the electronic apparatus.

According to the present invention, suppliable power may be increased while compliance with USB standards is ensured.

The above and further objects and features of the invention will more fully be apparent from the following detailed description with accompanying drawings.

DETAILED DESCRIPTION

Embodiment 1

Figure 1:
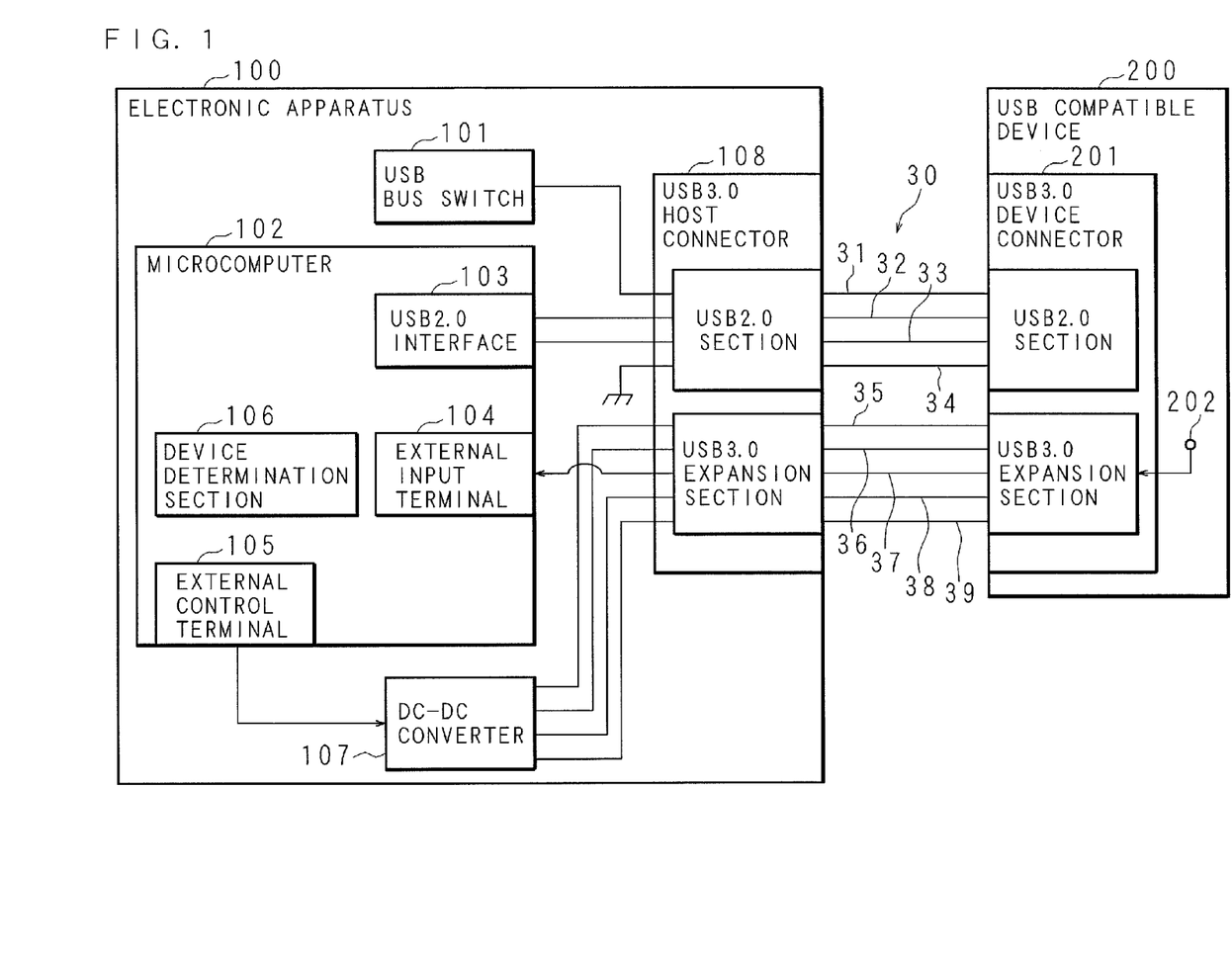
FIG. 1 is a block diagram illustrating an example of a configuration of an electronic apparatus system according to Embodiment 1.

Hereinafter, the present invention will be described with reference to the drawings illustrating embodiments thereof. FIG. 1 is a block diagram illustrating an example of a configuration of an electronic apparatus system according to Embodiment 1. As illustrated in FIG. 1, the electronic apparatus system according to Embodiment 1 includes an electronic apparatus 100 and a USB compatible device 200. The electronic apparatus 100 and the USB compatible device 200 are connected to each other via USB connectors, each of which has a connector-like shape and has terminals 1 to 9 (first to ninth terminals) so as to be compliant with USB 3.0 standards, for example. Note that although not illustrated in FIG. 1, instead of the USB compatible device 200, a USB 2.0 device may be connected to the electronic apparatus 100.

Note that in the following description, a USB 2.0 device is defined as a device that is capable of performing data transfer compliant with USB 2.0 standards and is operated at or below a current specified value (500 mA) defined by USB 2.0 standards. Further, a USB 3.0 device, which will be described later, is defined as a device that is capable of performing data transfer compliant with USB 3.0 standards and is operated at or below a current specified value (900 mA) defined by USB 3.0 standards. Furthermore, a USB compatible device is defined as a device (i.e., a USB compatible device compliant with USB 2.0 standards) which is capable of performing data transfer compliant with USB 2.0 standards and which requires a current higher than the current specified value (500 mA) defined by USB 2.0 standards, or a device (i.e., a USB compatible device compliant with USB 3.0 standards) which is capable of performing data transfer compliant with USB 3.0 standards and which requires a current higher than the current specified value (900 mA) defined by USB 3.0 standards.

The USB compatible device 200 is a USB compatible device compliant with USB 2.0 standards, and includes a USB 3.0 device connector 201 (USB connector) and a voltage source 202. The voltage source 202 is connected to a terminal 7 of the USB 3.0 device connector 201. Note that a configuration for performing functions of the USB compatible device 200 itself is omitted for the sake of simplicity.

A USB 3.0 host connector 108 of the electronic apparatus 100 and the USB 3.0 device connector 201 of the USB compatible device 200 each serve as a USB connector including terminals 1 to 9. The terminals 1 to 4 serve as a USB 2.0 section, and the terminals 5 to 9 serve as a USB 3.0 expansion section.

The USB 3.0 host connector 108 and the USB 3.0 device connector 201 are connected to each other through a cable 30. Note that the USB 3.0 device connector 201 may be directly connected to the USB 3.0 host connector 108 without the use of the cable 30.

In accordance with the order of the terminals 1 to 9, the cable 30 has: a VBUS 31 (e.g., a 5 V power supply line); USB 2.0 differential signal lines 32 and 33; a ground line 34; power supply lines 35 and 36 for the USB compatible device 200; a signal line 37 for determining the type of an external device (i.e., for making a distinction among a USB 2.0 device, a USB 3.0 device and a USB compatible device); and power supply lines 38 and 39 for the USB compatible device 200.

When a USB 2.0 device is connected to the electronic apparatus 100, the electronic apparatus 100 uses the terminals 1 to 4 to perform data transfer and power supply compliant with USB 2.0 standards. On the other hand, when the USB compatible device 200 is connected to the electronic apparatus 100, the electronic apparatus 100 uses the terminals 1 to 9 to perform data transfer compliant with USB 2.0 standards and supply of a current (power) higher than a USB 2.0 standard specified value.

A USB bus switch 101 supplies a given voltage (of about 5 V) to a USB 2.0 device or the USB compatible device 200 via the terminal 1 (VBUS 31).

When the USB compatible device 200 is connected, a DC-DC converter 107 supplies a current (power) higher than a USB 2.0 standard specified value to the USB compatible device 200 via the terminals 5, 6, 8 and 9 (i.e., the power supply lines 35, 36, 38 and 39) under the control of a microcomputer 102.

The microcomputer 102 is implemented by an integrated circuit for controlling the electronic apparatus 100. The microcomputer 102 has a USB 2.0 host controller.

A USB 2.0 interface 103 performs data transfer compliant with USB 2.0 standards between the electronic apparatus 100 and a USB 2.0 device, and between the electronic apparatus 100 and the USB compatible device 200.

An external input terminal 104 is connected with the terminal 7 of the USB 3.0 host connector 108. The external input terminal 104 is pulled down to a ground level via a resistor inside the microcomputer 102.

A device determination section 106 determines whether or not a current flowing through the terminal 7 of the USB 3.0 host connector 108 via the external input terminal 104 is equal to or higher than a given current threshold value. When the current flowing through the terminal 7, i.e., the current flowing through the external input terminal 104, is equal to or higher than the current threshold value, the device determination section 106 determines that the USB compatible device 200 is connected.

In the case of a USB 2.0 device, the terminals 1 to 4 (first to fourth terminals) are used, but nothing is connected to the terminals 5 to 9 (fifth to ninth terminals); hence, for example, the terminal 7 (seventh terminal) is in an opened (open) state and has a high impedance. When a USB 2.0 device is connected, no current flows through the terminal 7; therefore, when a current equal to or higher than the current threshold value cannot be detected, the device determination section 106 can determine that the external device is a USB 2.0 device. On the other hand, when the USB compatible device 200 is connected, a current from the voltage source 202 flows through the terminal 7; hence, upon detection of a current equal to or higher than the current threshold value, the device determination section 106 can determine that the external device is the USB compatible device 200.

When the USB compatible device 200 is connected, the microcomputer 102 starts an operation of the DC-DC converter 107 via an external control terminal 105. The DC-DC converter 107 supplies power to the USB compatible device 200 via the terminals 5, 6, 8 and 9.

As mentioned above, the terminals 5 to 9 are not used for a USB 2.0 device. Therefore, when a USB 2.0 device is connected, power is supplied via the terminal 1 (i.e., the VBUS 31); on the other hand, when the USB compatible device 200 is connected, power is supplied via the terminals 5, 6, 8 and 9 in addition to the terminal 1. Thus, a USB 2.0 device is connectable to the electronic apparatus 100, and in addition, an increase in supplied power is enabled when the USB compatible device 200 is connected to the electronic apparatus 100.

Referring to FIG. 1, the DC-DC converter 107 is configured to use all of the terminals 5, 6, 8 and 9, but the embodiment is not limited to such a configuration. Alternatively, the DC-DC converter 107 may be configured to use at least one of the terminals 5, 6, 8 and 9. Furthermore, when power is supplied via a plurality of the terminals 5, 6, 8 and 9, the value of a voltage to be supplied may be changed in accordance with the terminals.

In the example illustrated in FIG. 1, the microcomputer 102 is implemented as a component having a USB host controller, but the embodiment is not limited to this example. Alternatively, the present invention may also be applied to a case where a component having a USB host controller is implemented by a SOC (System on a Chip) or a Southbridge chip set, for example.

Figure 2:
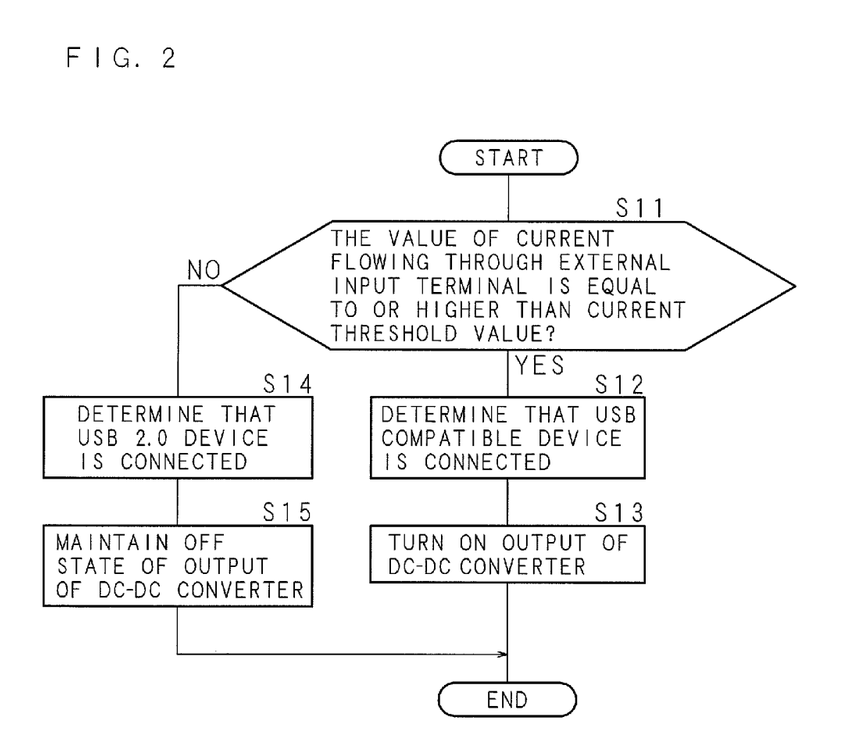
FIG. 2 is a flow chart illustrating a procedure of processing performed by an electronic apparatus according to Embodiment 1.

FIG. 2 is a flow chart illustrating a procedure of processing performed by the electronic apparatus 100 according to Embodiment 1. The following description will be made on the assumption that the processing is mainly performed by the microcomputer 102. The microcomputer 102 determines whether or not the value of a current flowing through the external input terminal 104 (or the terminal 7) is equal to or higher than a current threshold value (S11).

When the current value is equal to or higher than the current threshold value (i.e., when the answer is YES in S11), the microcomputer 102 determines that the USB compatible device 200 is connected (S12), turns ON an output of the DC-DC converter 107 (S13), and then ends the processing.

When the current value is not equal to or higher than the current threshold value (i.e., when the answer is NO in S11), the microcomputer 102 determines that a USB 2.0 device is connected (S14), maintains an OFF state of the output of the DC-DC converter 107 (S15), and then ends the processing.

Embodiment 2

The electronic apparatus 100 according to Embodiment 1 is capable of determining which of the devices, i.e., a USB 2.0 device and the USB compatible device 200, is connected, and capable of supplying a current (power) higher than the USB 2.0 standard specified value to the USB compatible device 200 while enabling data transfer compliant with USB 2.0 standards. However, the embodiment is not limited to a USB 2.0 device, but a determination function and a power supply function may also be expanded for both types of external devices, i.e., a USB 2.0 device and a USB 3.0 device.

Figure 3:
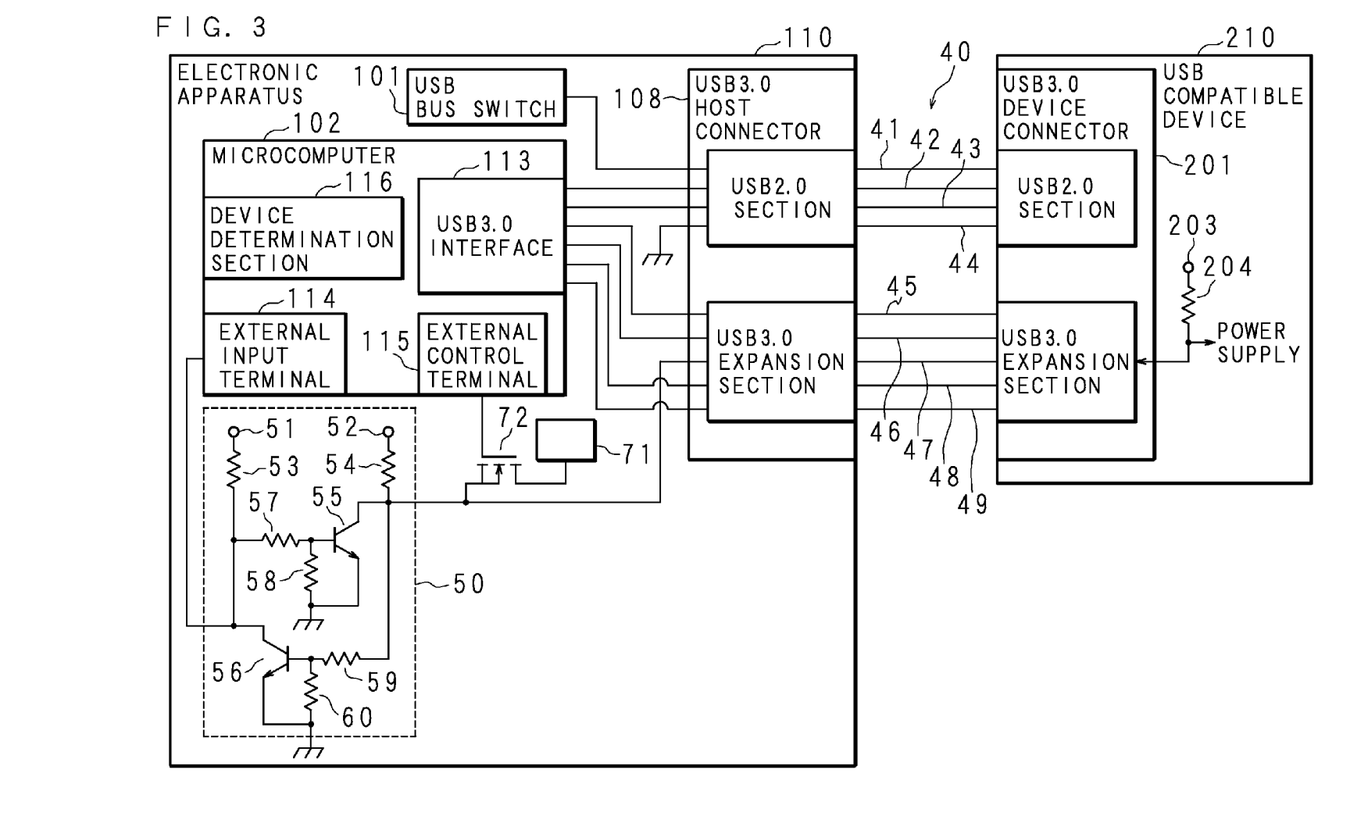
FIG. 3 is a block diagram illustrating an example of a configuration of an electronic apparatus system according to Embodiment 2.

FIG. 3 is a block diagram illustrating an example of a configuration of an electronic apparatus system according to Embodiment 2. As illustrated in FIG. 3, the electronic apparatus system according to Embodiment 2 includes an electronic apparatus 110 and a USB compatible device 210. Similarly to Embodiment 1, the electronic apparatus 110 and the USB compatible device 210 are connected to each other via USB connectors, each of which has a connector-like shape and has terminals 1 to 9 (first to ninth terminals) so as to be compliant with USB 3.0 standards, for example. Note that although not illustrated in FIG. 3, instead of the USB compatible device 210, a USB 2.0 device or a USB 3.0 device may be connected to the electronic apparatus 110.

The USB compatible device 210 is a USB compatible device compliant with USB 3.0 standards, and includes a USB 3.0 device connector 201 (USB connector), a voltage source 203 and a pull-down resistor 204. The voltage source 203 is connected to a terminal 7 of the USB 3.0 device connector 201 via the resistor 204. Further, the USB compatible device 210 is capable of supplying power to its internal components via the terminal 7. Note that a configuration for performing functions of the USB compatible device 210 itself is omitted for the sake of simplicity.

A USB 3.0 host connector 108 and the USB 3.0 device connector 201 are connected to each other through a cable 40. Note that the USB 3.0 device connector 201 may be directly connected to the USB 3.0 host connector 108 without the use of the cable 40.

In accordance with the order of terminals 1 to 9, the cable 40 has: a VBUS 41 (e.g., a 5 V power supply line); USB 2.0 differential signal lines 42 and 43; a ground line 44; differential signal lines 45 and 46 for transmission for USB 3.0; a feeder line 47 for determining the type of an external device (i.e., for making a distinction among a USB 2.0 device, a USB 3.0 device and a USB compatible device), and for supplying power to the USB compatible device 210; and differential signal lines 48 and 49 for receiving for USB 3.0.

When a USB 2.0 device is connected to the electronic apparatus 110, the electronic apparatus 110 uses the terminals 1 to 4 to perform data transfer and power supply compliant with USB 2.0 standards. Furthermore, when a USB 3.0 device is connected to the electronic apparatus 110, the electronic apparatus 110 uses the terminals 1 to 9 to perform data transfer and power supply compliant with USB 3.0 standards. Moreover, when the USB compatible device 210 is connected to the electronic apparatus 110, the electronic apparatus 110 uses the terminals 1 to 9 to perform data transfer compliant with USB 3.0 standards and supply of a current (power) higher than a USB 3.0 standard specified value.

A source of an FET 72 serving as a switching element is connected to the terminal 7 (feeder line 47) of the USB 3.0 host connector 108, a drain of the FET 72 is connected to an output terminal of a power source section 71, and a gate of the FET 72 is connected to an external control terminal 115.

Further, the terminal 7 (feeder line 47) of the USB 3.0 host connector 108 is connected to a voltage source 52 via a resistor 54, and is also connected to a base of a transistor 56 via a resistor 59. A bias resistor 60 is connected between the base and emitter of the transistor 56. A collector of the transistor 56 is connected to an external input terminal 114, connected to a voltage source 51 via a resistor 53, and further connected to a base of a transistor 55 via a resistor 57. A bias resistor 58 is connected between the base and emitter of the transistor 55. A collector of the transistor 55 is connected to the terminal 7 of the USB 3.0 host connector 108.

With the above-described configuration, a voltage detection section 50 inverts a voltage of the terminal 7 of the USB 3.0 host connector 108 and outputs the inverted voltage (turn-over voltage) to the external input terminal 114, thus functioning as the voltage detection section for detecting the turn-over voltage obtained by inverting the voltage of the terminal 7 of the USB 3.0 host connector 108. In other words, the voltage detection section 50 has the function of performing level transition on the voltage of the terminal 7 of the USB 3.0 host connector 108.

Hereinafter, a voltage detected by the voltage detection section 50 when an external device is connected will be described. Note that rising of a voltage of the voltage source 52 precedes that of a voltage of the voltage source 51, and in an initial state, the FET 72 is OFF, the transistor 55 is OFF, and the transistor 56 is ON. Specifically, in the initial state, the voltage of the voltage source 52 is applied to the base of the transistor 56 to turn ON the transistor 56, and a voltage of the collector of the transistor 56 becomes a ground level, so that the transistor 55 is turned OFF.

When no external device is connected or a USB 2.0 device is connected, nothing is connected to the terminal 7 of the USB 3.0 host connector 108 from outside; therefore, the terminal 7 enters an opened (open) state and a high impedance state. Since the terminal 7 is pulled up to the voltage source 52 via the resistor 54, the voltage of the terminal 7 is at a high level, so that the ON state of the transistor 56 is maintained, and the voltage of the external input terminal 114 is maintained at a ground level (i.e., a voltage equal to or lower than a voltage threshold value).

In the case of a USB 3.0 device, the terminal 7 of the USB 3.0 device connector 201 is internally connected to a ground level; hence, when a USB 3.0 device is connected, the voltage of the terminal 7 of the USB 3.0 host connector 108 becomes a ground level. Therefore, the state of the transistor 56 is changed from the ON state to the OFF state, and the voltage of the voltage source 51 is applied to the base of the transistor 55, so that the state of the transistor 55 is changed from the OFF state to the ON state. In this case, since the voltage of the voltage source 51 is applied to the external input terminal 114, the voltage of the external input terminal 114 becomes a voltage equal to or higher than the voltage threshold value. Note that the voltage threshold value may be set at a voltage between the voltage of the voltage source 51 and a ground level.

In the case of the USB compatible device 210, the terminal 7 of the USB 3.0 device connector 201 is pulled up to the voltage source 203; hence, when the USB compatible device 210 is connected, the voltage of the terminal 7 of the USB 3.0 host connector 108 becomes a high level, so that the transistor 56 is turned ON and the voltage of the external input terminal 114 becomes a ground level (i.e., the voltage equal to or lower than the voltage threshold value).

In other words, when the USB compatible device 210 is connected, the voltage of the external input terminal 114 becomes equal to or lower than the voltage threshold value, and when a USB 3.0 device is connected, the voltage of the external input terminal 114 becomes a value higher than the voltage threshold value. When external devices to be connected are operationally limited to the USB compatible device 210 and a USB 3.0 device, which of the devices, i.e., the USB compatible device 210 and USB 3.0 device, is connected may be determined only by detecting the voltage of the external input terminal 114.

Further, a microcomputer 102 having a USB host controller is capable of not only detecting a connection with an external device but also detecting whether or not communication compliant with USB 2.0 standards is performed. Therefore, detection performed by the USB host controller of the microcomputer 102 is combined with detection of the voltage of the external input terminal 114, thus making it possible to further determine whether or not a USB 2.0 device is connected and determine a state in which an external device is yet to be connected.

In accordance with the voltage level of the external input terminal 114, a device determination section 116 determines that the USB compatible device 210 is connected or a USB 3.0 device is connected. Further, based on the voltage level of the external input terminal 114 and a result of the detection performed by the USB host controller, the device determination section 116 determines that an external device is yet to be connected, a USB 2.0 device is connected, a USB 3.0 device is connected, or the USB compatible device 210 is connected.

Upon determination by the device determination section 116 that the USB compatible device 210 is connected, the microcomputer 102 changes a voltage level of the external control terminal 115 to a high level to turn ON the FET 72. Note that when the FET 72 is not an n-channel type FET but is a p-channel type FET, the voltage level of the external control terminal 115 may be changed to a low level to turn ON the FET 72.

Upon turning ON of the FET 72, power from the power source section 71 is supplied to the USB compatible device 210 via the FET 72 and the terminal 7 of the USB 3.0 host connector 108. Note that when the USB compatible device 210 is connected, the transistor 55 is OFF, and therefore, power from the power source section 71 is supplied to the terminal 7 via the FET 72. In other words, the voltage detection section 50 has part of functions of a power source control section.

A USB 3.0 interface 113 performs data transfer compliant with USB 2.0 standards between the electronic apparatus 110 and a USB 2.0 device, performs data transfer compliant with USB 3.0 standards between the electronic apparatus 110 and a USB 3.0 device, and performs data transfer compliant with USB 3.0 standards between the electronic apparatus 110 and the USB compatible device 210.

As mentioned above, the electronic apparatus 110 according to Embodiment 2 includes: the FET 72 (switching element) interposed between the output terminal of the power source section 71 (power supply section) and the terminal 7 (seventh terminal); and the voltage detection section 50 for detecting the turnover voltage (voltage level transition) obtained by inverting the voltage of the terminal 7. When the voltage detected by the voltage detection section 50 (i.e., the voltage of the external input terminal 114) is equal to or lower than the voltage threshold value, the device determination section 116 determines that the USB compatible device 210 is detected. Upon determination by the device determination section 116 that the USB compatible device 210 is connected, the microcomputer 102 serving as the power source control section carries out control so as to change the voltage level of the external control terminal 115 to a high level to turn ON the FET 72, thereby supplying power from the power source section 71 (power supply section) to the terminal 7.

In the case of a USB 3.0 device, the terminals 5, 6, 8 and 9 (fifth, sixth, eighth and ninth terminals) are used for data transfer. Therefore, when a USB 3.0 device is connected, power is supplied via the terminal 1 (VBUS); on the other hand, when the USB compatible device 210 is connected, power is supplied via the terminal 7 in addition to the terminal 1. Thus, a USB 3.0 device is connectable to the electronic apparatus 110, and in addition, an increase in supplied power is enabled when the USB compatible device 210 is connected to the electronic apparatus 110.

Figure 4:
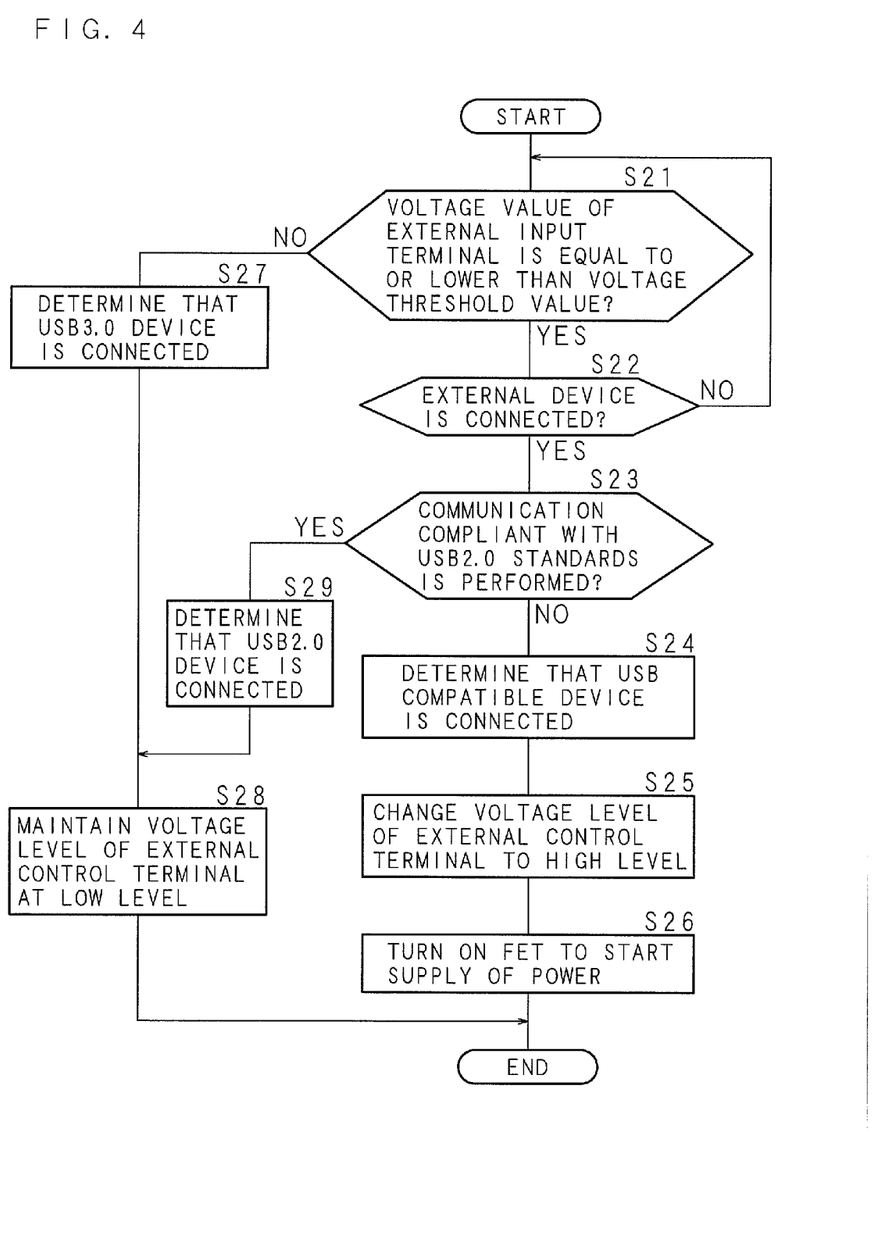
FIG. 4 is a flow chart illustrating a procedure of processing performed by an electronic apparatus according to Embodiment 2.

FIG. 4 is a flow chart illustrating a procedure of processing performed by the electronic apparatus 110 according to Embodiment 2. The following description will be made on the assumption that the processing is mainly performed by the microcomputer 102. The microcomputer 102 determines whether or not a voltage value of the external input terminal 114 is equal to or lower than a voltage threshold value (S21). When the voltage value is equal to or lower than the voltage threshold value (i.e., when the answer is YES in S21), the microcomputer 102 determines whether or not an external device is connected (S22).

When no external device is connected (i.e., when the answer is NO in S22), the microcomputer 102 performs the process of Step S21 again. When an external device is connected (i.e., when the answer is YES in S22), the microcomputer 102 determines whether or not communication compliant with USB 2.0 standards is performed (S23). When communication compliant with USB 2.0 standards is not performed (i.e., when the answer is NO in S23), the microcomputer 102 determines that the USB compatible device 210 is connected (S24).

The microcomputer 102 changes the voltage level of the external control terminal 115 to a high level (S25), turns ON the FET 72 to start supply of power to the USB compatible device 210 (S26), and then ends the processing.

When the voltage value is not equal to or lower than the voltage threshold value (i.e., when the answer is NO in S21), the microcomputer 102 determines that a USB 3.0 device is connected (S27), maintains the voltage level of the external control terminal 115 at a low level (S28), and then ends the processing without performing the process of Step S26.

When communication compliant with USB 2.0 standards is performed (i.e., when the answer is YES in S23), the microcomputer 102 determines that a USB 2.0 device is connected (S29), and performs the process of Step S28.

Note that when a USB 2.0 device is not operationally used, the processes of Steps S23 and S29 may be omitted.

Even in a case where functions of USB connector terminals are different from those of the USB connector terminals illustrated in the example of FIG. 1 or FIG. 3, for example, determination of the type of an external device and power supply may be performed by utilizing unused terminal(s) as described in Embodiment 1, or when two or more ground lines exist, determination of an external device and power supply may be performed by utilizing one of the ground lines as described in Embodiment 2.

As described in Embodiments 1 and 2, the electronic apparatus 100 or 110 includes: the power supply section (i.e., the DC-DC converter 107 or the power source section 71) for supplying power to an external device connected via a USB connector; and the device determination section 106 or 116 for determining an external device connected to the USB connector. Upon determination by the device determination section 106 or 116 that the external device is the USB compatible device 200 or 210, the power supply section (i.e., the DC-DC converter 107 or the power source section 71) supplies power to the USB compatible device 200 or 210. When power is supplied to the USB compatible device 200 or 210, the terminals other than the terminals 1 to 4, the functions of which are defined by USB 2.0 and USB 3.0 standards, may be used.

Thus, when a USB 2.0 device is connected, data transfer and power supply compliant with USB 2.0 standards are performed, and when a USB 3.0 device is connected, data transfer and power supply compliant with USB 3.0 standards are performed; in addition, when the USB compatible device 200 or 210 is connected, necessary power may be supplied from the power supply section (i.e., the DC-DC converter 107 or the power source section 71), suppliable power may be increased while compliance with USB standards is ensured, and large power exceeding a value defined by USB standards may be supplied.

Further, the device determination section 106 or 116 determines an external device via the terminal 7 (seventh terminal). In the case of a USB 3.0 interface, for example, the terminal 1 (first terminal) is associated with a VBUS (5 V power supply line), the terminals 2 and 3 (second and third terminals) are associated with USB 2.0 differential signal lines, the terminal 4 (fourth terminal) is associated with a ground line, the terminals 5 and 6 (fifth and sixth terminals) are associated with differential signal lines for transmission for USB 3.0, the terminal 7 (seventh terminal) is associated with a second ground line, and the terminals 8 and 9 (eighth and ninth terminals) are associated with differential signal lines for receiving for USB 3.0. In order to perform data transfer and power supply compliant with USB 2.0 and USB 3.0 standards, the terminals 1 to 6, the terminal 8 and the terminal 9 are essential, and therefore, the terminal 7 associated with the second ground line is used for a signal line for determining an external device. Thus, the type of an external device may be determined while compliance with USB 2.0 and USB 3.0 standards is ensured.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electronic apparatus including a USB connector for a USB 3.0 interface having first to ninth terminals, the electronic apparatus comprising:
   a power supply section for supplying power to an external device connected via the USB connector; and
   a device determination section for determining which of a USB 2.0 device, a USB 3.0 device and a USB compatible device requiring a current equal to or higher than a value defined by USB standard corresponds to the external device,
   wherein
   when a current flowing through the seventh terminal is equal to or higher than a current threshold value, the device determination section determines that the USB compatible device is connected, and
   upon determination by the device determination section that the external device is a USB compatible device, the power supply section supplies power to the USB compatible device.

2. The electronic apparatus according to claim 1,
   wherein the power supply section supplies power via at least one of the fifth, sixth, eighth and ninth terminals.

3. The electronic apparatus according to claim 1, further comprising:
   a switching element interposed between an output terminal of the power supply section and the seventh terminal;
   a voltage detection section for detecting a turnover voltage obtained by inverting a voltage of the seventh terminal; and
   a communication determination section for determining whether or not communication compliant with USB 2.0 standard is performed,
   wherein when the voltage detected by the voltage detection section is equal to or lower than a voltage threshold value and the communication determination section determined that communication compliant with USB 2.0 standard is not performed, the device determination section determines that the USB compatible device is connected, and
   wherein the electronic apparatus further comprises a power source control section for carrying out control so as to turn on the switching element to supply power from the power supply section to the seventh terminal upon determination by the device determination section that the USB compatible device is connected.

4. An electronic apparatus system comprising:
   an electronic apparatus including a USB connector for a USB 3.0 interface having first to ninth terminals, having a power supply section for supplying power to an external device connected via the USB connector; and
   a device determination section for determining which of a USB 2.0 device, a USB 3.0 device and a USB compatible device requiring a current equal to or higher than a value defined by USB standard corresponds to the external device,
   wherein
   when a current flowing through the seventh terminal is equal to or higher than a current threshold value, the device determination section determines that the USB compatible device is connected, and upon determination by the device determination section that the external device is a USB compatible device, the power supply section supplies power to the USB compatible device; and
at least one external device that is a USB 2.0 device, a USB 3.0 device or a USB compatible device.

* * * * *